United States Patent [19]
Maute et al.

[11] Patent Number: 5,445,571
[45] Date of Patent: Aug. 29, 1995

[54] CHAIN LOCK

[75] Inventors: Dieter Maute, Aalen; Hans-Jürgen Scherle, Neresheim, all of Germany

[73] Assignee: RUD-Kettenfabrik Rieger & Dietz GmbH. u Co., Aalen-Unterkochen, Germany

[21] Appl. No.: 311,548

[22] Filed: Sep. 23, 1994

[30] Foreign Application Priority Data

Sep. 27, 1993 [DE] Germany .................. 43 33 261.7

[51] Int. Cl.⁶ ............................................. F16G 13/00
[52] U.S. Cl. .................................... 474/219; 474/220
[58] Field of Search .................. 474/219–225

[56] References Cited

FOREIGN PATENT DOCUMENTS 912644 8/1946 France .................... 474/220
2188395 9/1987 United Kingdom ........ 474/219

Primary Examiner—Michael Powell Buiz
Attorney, Agent, or Firm—Mark P. Stone

[57] ABSTRACT

In a chain lock for link chains with a plurality of lock parts (1,2) the lock parts (1,2) are connected with each other by projections. For increasing the load-bearing capacity of the chain lock the projections (5–10) in the area of the transition of their feet into the lock parts (1,2) are provided with impressions effected by depressions (17) which impressions lead to compressive stresses which influence positively the stress conditions in the loaded lock.

20 Claims, 4 Drawing Sheets

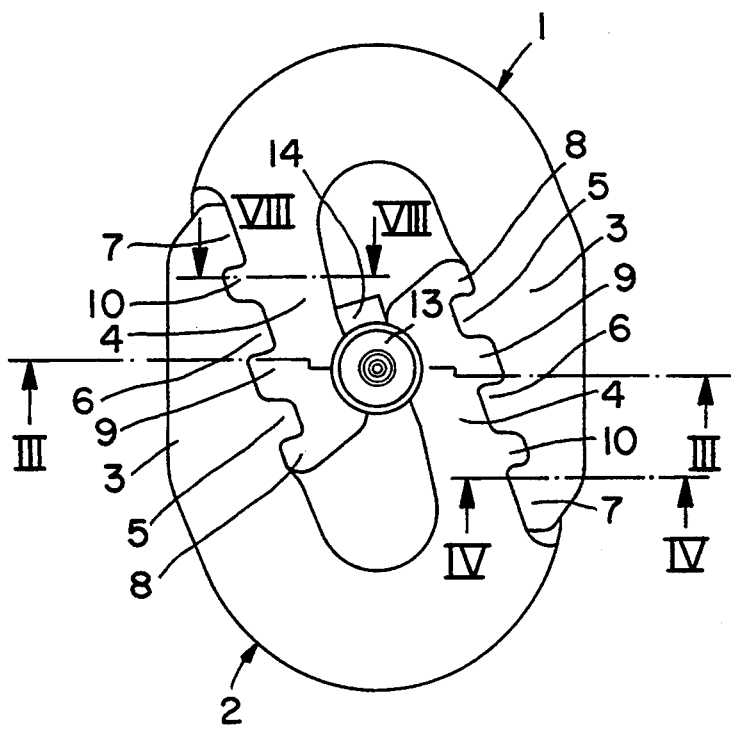
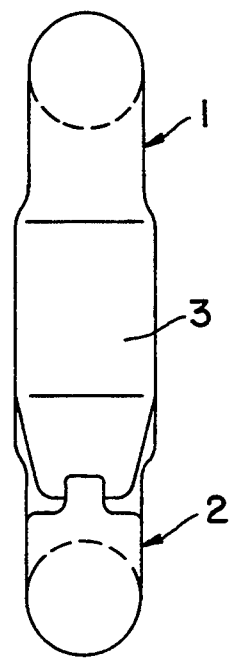
FIG.1  FIG.2
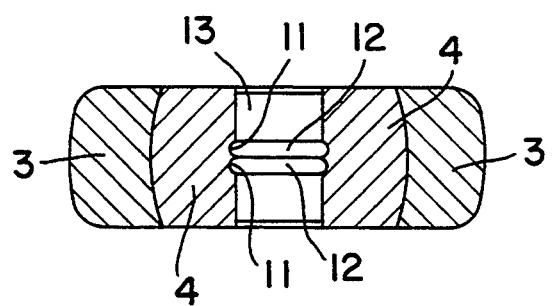
FIG.3

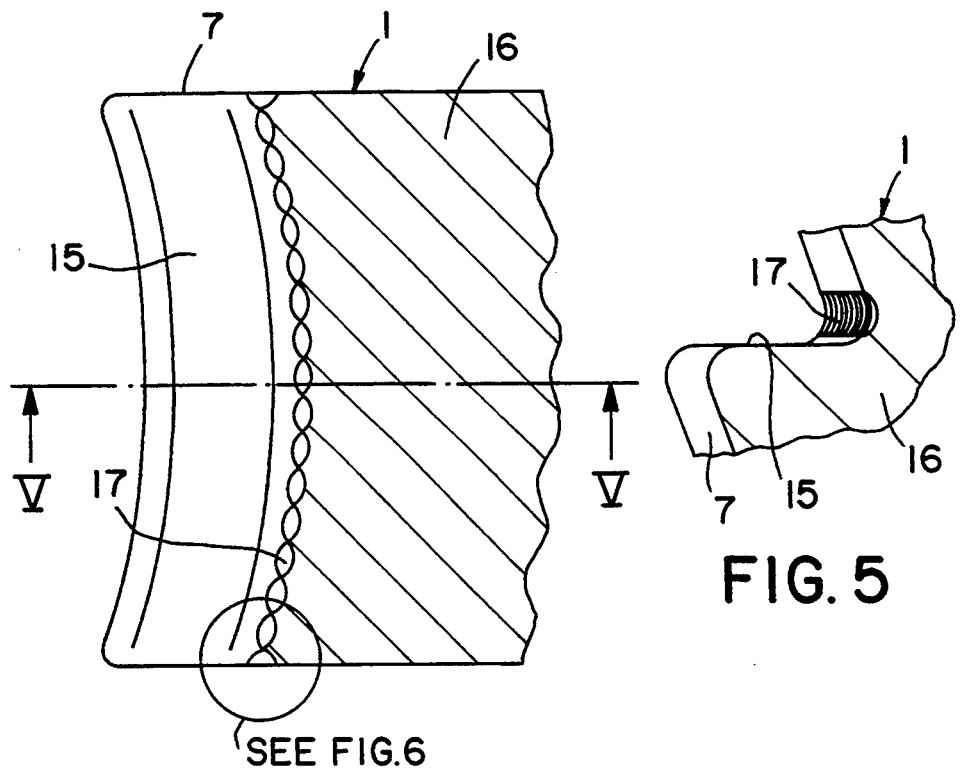
FIG. 4
FIG. 5
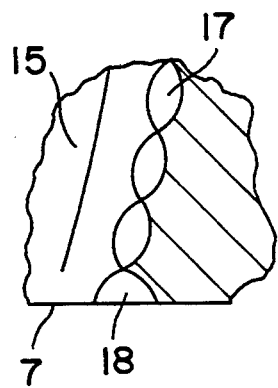
FIG. 6
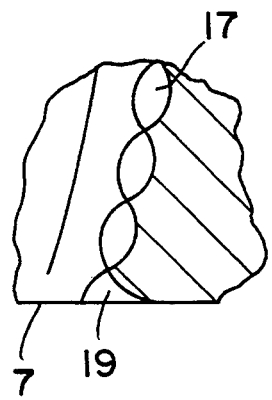
FIG. 7

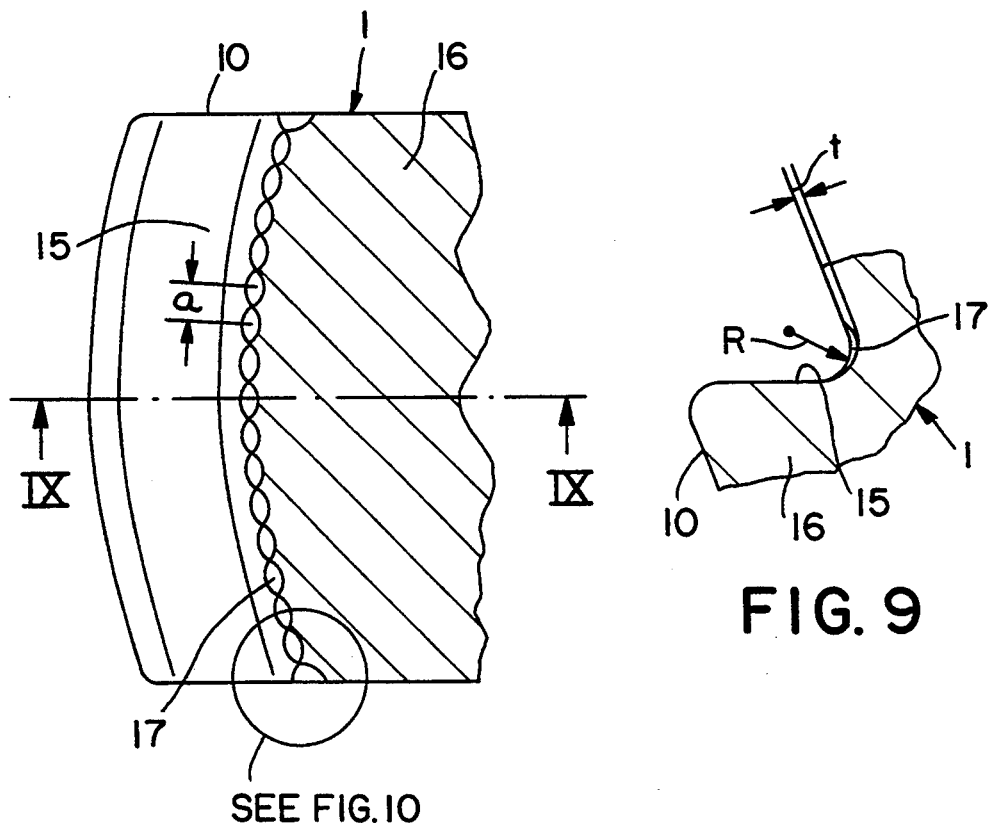
FIG. 8
FIG. 9
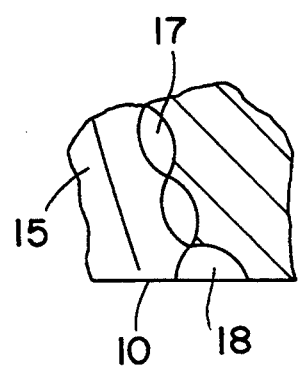
FIG. 10
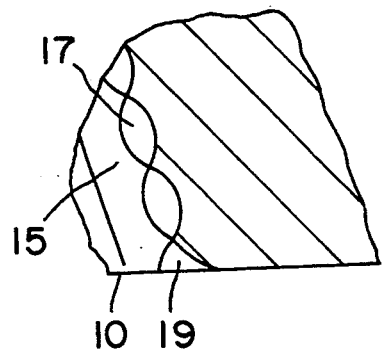
FIG. 11

CHAIN LOCK

BACKGROUND OF THE INVENTION

The invention relates to a chain lock for link chains, which comprises at least two lock parts which, in the closed position, engage with one another by means of projections and are secured by at least one locking element.

Various forms of chain locks of the above-described type are known. The problem arising in all such forms consists in adapting the strength of the chain lock as far as possible to the strength of the links of the chain which are connected to one another by the respective chain lock. The efforts made in the trade to master this problem have hitherto been restricted to appropriate designing of the external shape of the lock parts, and in particular the position and size of the projections. Thus, in the case of a chain lock comprising two identical halves each consisting of a U-shaped bow having an inner limb and an outer limb, it was proposed in DE-PS 19 01 367 to increase the cross-section of the outer limbs in relation to that of the inner limbs, while in another chain lock known from DE 32 07 629 C2 use was made of pairs of projections of different thicknesses, taking into account the distribution of forces in the lock.

SUMMARY OF THE INVENTION

The object on which the invention is based is that of increasing the strength of chain locks, not by varying the external shape of the lock parts, as was the practice hitherto, but by directly influencing the stress conditions in the lock while retaining a shape known to be appropriate, this being done in particular by increasing loadability, that is to say the transmissible tensile forces, of the lock subjected to continuous pulsating stress. In a chain lock of the relevant type this object is achieved according to the invention in that, in the region of the transition from their feet to the main body of the respective lock part, at least some of the projections are plastically deformed with the aid of a pressing or percussion tool for the purpose of surface strain-hardening.

Through the locally defined plastic deformation claimed there are produced, at the points where particularly critical tensile direct stresses occur, compressive stresses which reduce the level of tensile direct stresses in a manner which leads to an increase of more than 50% of the dynamic strength of chain locks of the relevant type.

A solution in which, in the region of the transition of their feet into the main body of the respective lock part, the projections have depressions corresponding to the tip of the pressing or percussion tool, which is in the form of a punch, is found particularly advantageous. The depressions can in fact not only be formed with relatively little expenditure of force and expense for tools, but they also permit optimum adaptation of the position of the compressive stresses to the stress conditions in the chain lock.

Further details and advantageous features of the chain lock according to the invention can be seen in the subclaims and the following description of a particularly appropriate embodiment of the invention, which is illustrated in the accompanying drawings, in which:

BRIEF DESCRIPTION OF THE DRAWINGS

FIG. 1 is a plan view of a chain lock,

FIG. 2 is a side view of the chain lock shown in FIG. 1,

FIG. 3 is a section on the line III—III in FIG. 1,

FIG. 4 is a section through the outer limb of the top half of the chain lock shown in FIG. 1, taken on the line IV—IV in FIG. 1, FIG. 5 is a section on the line V—V in FIG. 4, FIG. 6 shows a detail of the region of the circle VI in FIG. 4, FIG. 7 shows a modification of the configuration of the end of a row of depressions shown in FIG. 6, FIG. 8 is a section through the inner limb of the top half of the chain lock shown in FIG. 1, taken on the line VIII—VIII in FIG. 1, FIG. 9 is a section on the line IX—IX in FIG. 8, FIG. 10 shows a detail of the region of the circle X in FIG. 8, FIG. 11 shows a modification of the configuration of the end of a row of depressions shown in FIG. 10.

DESCRIPTION OF THE BEST MODE FOR CARRYING OUT THE INVENTION

Figure 12:
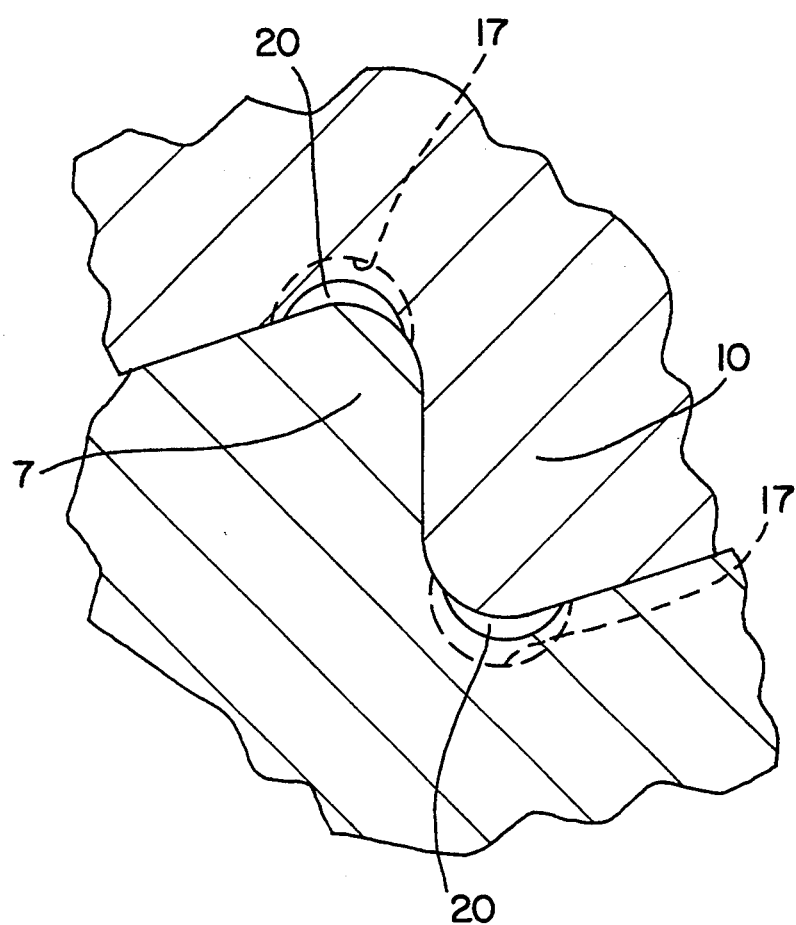
FIG. 12 shows the conditions in the region of the tooth foot and tooth tip in an embodiment having partially overlapping depressions.

In FIG. 1, two substantially U-shaped lock halves having an identical shape are designated 1 and 2, each of them having an outer limb 3 and an inner limb 4. The outer limbs have three projections formed by holding teeth 5, 6 and 7, and the inner limbs have three projections formed by holding teeth 8, 9 and 10.

The mutually facing surfaces of the inner limbs 4 are provided with catch recesses 11, in which expansion elements 12, which are in the form of spring rings and by which a cylindrical support element 13 is held in the locking position, can engage. During the introduction of the support element 13 into its locking position the expansion elements 12 can penetrate into the interior of grooves of the support element 13. 14 is a device securing the support element against rotation.

Details of the configuration of the holding tooth 7 of the limb 3 of the lock part 1 in the region of its root are shown on a larger scale in FIGS. 4 to 7. It can be seen that at the transition from the tooth flank 15, which effects the transmission of forces, to the tooth space region of the main body 16 of the lock part 1 a row of depressions 17 is formed. The depressions 17 are produced by pressing a tool, which has a tip in the form of a pressing punch, into the root of the tooth. Through the plastic deformation of the tooth root in the region of the depressions 17, permanent compressive stresses are built up. When the chain lock is subjected to stressing, the tensile direct stresses produced by the action of external forces must first overcome these compressive stresses before they can reach a level which can lead to harmful crack formation. In practice, the surprisingly great increase of dynamic strength of chain locks of the relevant type, which was initially mentioned above, is achieved through the plastic deformation of the tooth root. It is obvious that not only the outer holding tooth 7 of the respective outer limb 3, but also the associated inner holding tooth 10 of the respective inner limb 4 must be plastically deformed in a corresponding manner in the region of the tooth root, as is shown in FIGS. 8 to 11. Here also, depressions 17 are formed in the tooth root subjected to tensile stresses.

In this connection, it should be particularly mentioned that it is to be ensured that, in the region of the transition from the tooth root to the upper and lower sides of the limbs 3 and 4 of the respective lock part 1 or 2, plastic deformation must also be effected in order to build up compressive stresses, as is indicated in FIGS. 6 and 10 by the depressions 18, the shape of which, as is shown by the depressions 19 in FIGS. 7 and 11, may be modified.

The depressions 17 preferably have the negative shape of part of an ellipsoid whose semi-axes may be the same in the case of a spherical tool. In addition, however, pyramidal, frustopyramidal, conical or frustoconical pressing tools can also be used to form the depressions 17. The depth t of the indentations formed by the depressions 17 should amount to at least 2% and at most 20% of the radius R in the region of the transition from the tooth flank to the tooth root, and the smallest distance a between the centers of adjoining depressions 17 should be of the order of 5 to 15% of this radius R.

If the distance between the centers of adjoining depressions 17 is selected to be so short that over-lapping occurs in the region of their edges, a cavity 20, which acts as an undercut, is formed, as shown in FIG. 12, between the tooth root and the tooth tip of interengaging holding teeth.

We claim:

1. A chain lock for link chains, which comprises at least two lock parts which, in a closed position, engage with one another by means of projections and are secured by at least one locking element, wherein, in a region of the transition from their feet into a main body (16) of the respective lock part (1, 2), at least some of the projections (5-10) are plastically deformed with the aid of a pressing or percussion tool for the purpose of surface strain-hardening.

2. The chain lock as claimed in claim 1, wherein, in the region of the transition from their feet into the main body (16) of the respective lock part (1, 2), the projections (5-10) have depressions (17) corresponding to the tip of the pressing or percussion tool, which is in the form of a punch.

3. The chain lock as claimed in claim 1, wherein the depressions (17) are arranged in the zone of the transition, which has a substantially circular contour, from the foot end of the projections into the respective lock part (1,2), in which zone the highest tensile direct stress occurs when the lock is stressed.

4. The chain lock as claimed in claim 1, wherein the depressions (17) form at least one row of depressions which extends in the longitudinal direction of the tooth root of the projections (5-10) formed by holding teeth.

5. The chain lock as claimed in claim 1, wherein the region of the upper and lower sides, adjoining the ends of the projections (5-10), of the main body of the lock parts (1, 2) is likewise provided in each case with at least one depression (18, 19).

6. The chain lock as claimed in claim 1, wherein the shortest distance (a) between the centers of respective adjoining depressions (17) amounts to approximately 5 to 15% of the radius R in the region of the transition between the respective lock part (1,2) and the respective projection (5-10).

7. The chain lock as claimed in claim 1, wherein the depth (t) of the depressions (17) amounts to at least 2% of the radius (R) in the region of the transition between the respective lock part (1, 2) and the respective projection (5-10).

8. The chain lock as claimed in claim 1, wherein the depth (t) of the depressions (17) amounts to at most 20% of the radius (R) in the region of the transition between the respective lock part (1, 2) and the respective projection (5-10).

9. The chain lock as claimed in claim 1, wherein the shape of the inner surfaces of the depressions (17) corresponds to the negative shape of a part of the surface of an ellipsoid.

10. The chain lock as claimed in claim 9, wherein the shape of the inner surfaces of the depressions (17) corresponds to the negative shape of a body of rotation.

11. The chain lock as claimed in claim 10, wherein the shape of the inner surfaces of the depressions (17) corresponds to the shape of the inner surface of a portion of a spherical cap.

12. The chain lock as claimed in claim 1, wherein the lock parts (1, 2) consist of two substantially U-shaped lock halves, each of which has an outer limb (3) and an inner limb (4), the mutually facing sides of the inner and outer limbs (3, 4) being connected to one another, in the closed position of the lock, by in each case at least two and in each case at most four pairs of projections (5, 8; 6, 9; 7, 10) formed by holding teeth.

13. The chain lock as claimed in claim 12, wherein, in the plastically deformed region of the transition from the tooth flank of the holding teeth to the tooth space region of the main body of the respective lock part (1, 2) there is formed a cavity (20) produced by the plastic deformation and preventing contact between the tooth tip and the tooth root of interengaging holding teeth (5-10).

14. The chain lock as claimed in claim 2, wherein the depressions (17) are arranged in the zone of the transition, which has a substantially circular contour, from the foot end of the projections into the respective lock part (1, 2), in which zone the highest tensile direct stress occurs when the lock is stressed.

15. The chain lock as claimed in claim 2, wherein the depressions (17) form at least one row of depressions which extends in the longitudinal direction of the tooth root of the projections (5-10) formed by holding teeth.

16. The chain lock as claimed in claim 3, wherein the depressions (17) form at least one row of depressions which extends in the longitudinal direction of the tooth root of the projections (5-10) formed by holding teeth.

17. The chain lock as claimed in claim 2, wherein the region of the upper and lower sides, adjoining the ends of the projections (5-10), of the main body of the lock parts (1, 2) is likewise provided in each case with at least one depression (18, 19).

18. The chain lock as claimed in claim 3, wherein the region of the upper and lower sides, adjoining the ends of the projections (5-10), of the main body of the lock parts (1, 2) is likewise provided in each case with at least one depression (18, 19).

19. The chain lock as claimed in claim 4, wherein the region of the upper and lower sides, adjoining the ends of the projections (5-10), of the main body of the lock parts (1, 2) is likewise provided in each case with at least one depression (18, 19).

20. The chain lock as claimed in claim 2, wherein the shortest distance (a) between the centers of the respective adjoining depressions (17) amounts to approximately 5 to 15% of the radius R in the region of the transition between the respective lock part (1, 2) and the respective projection (5-10).

* * * * *